UNITED STATES PATENT OFFICE.

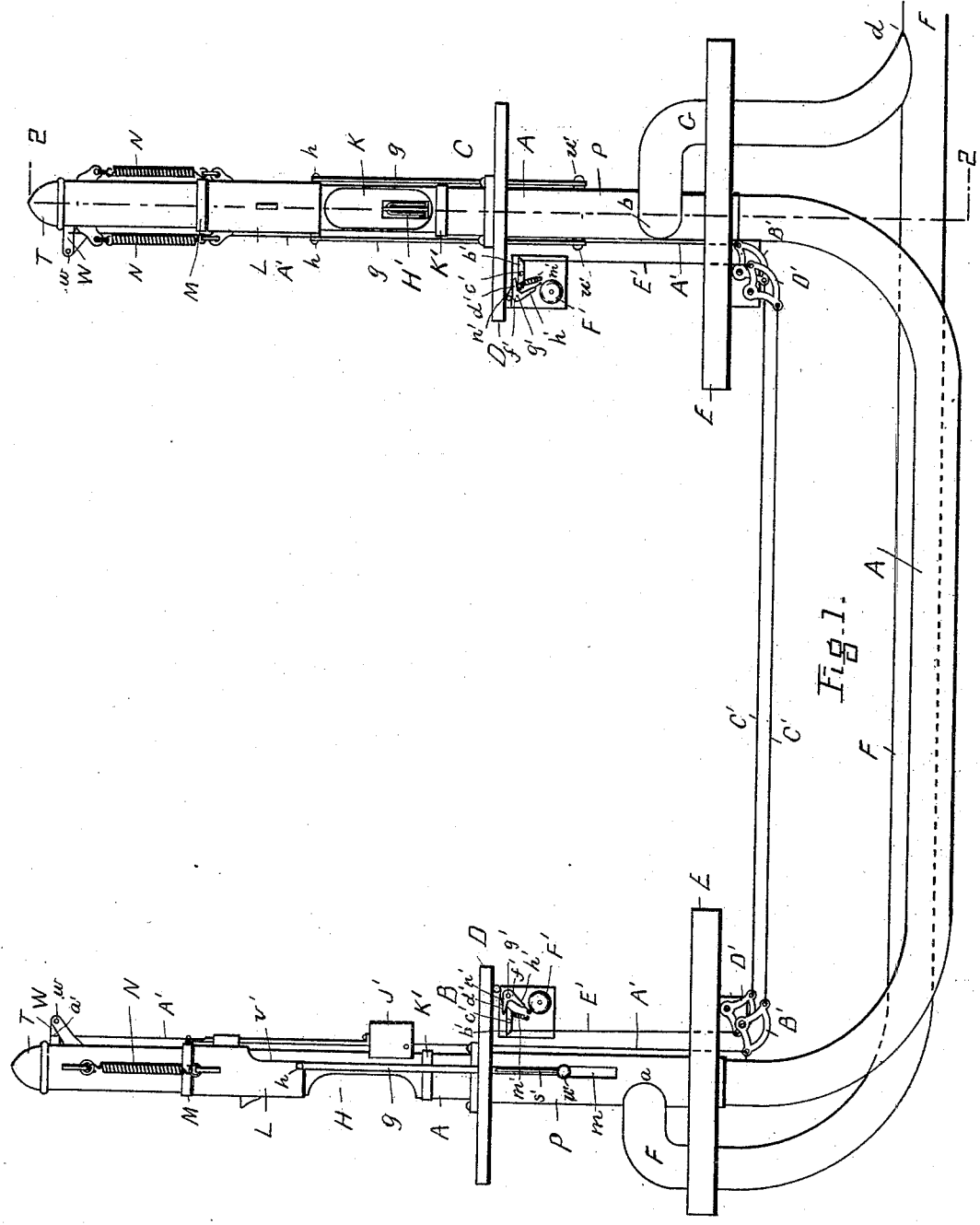

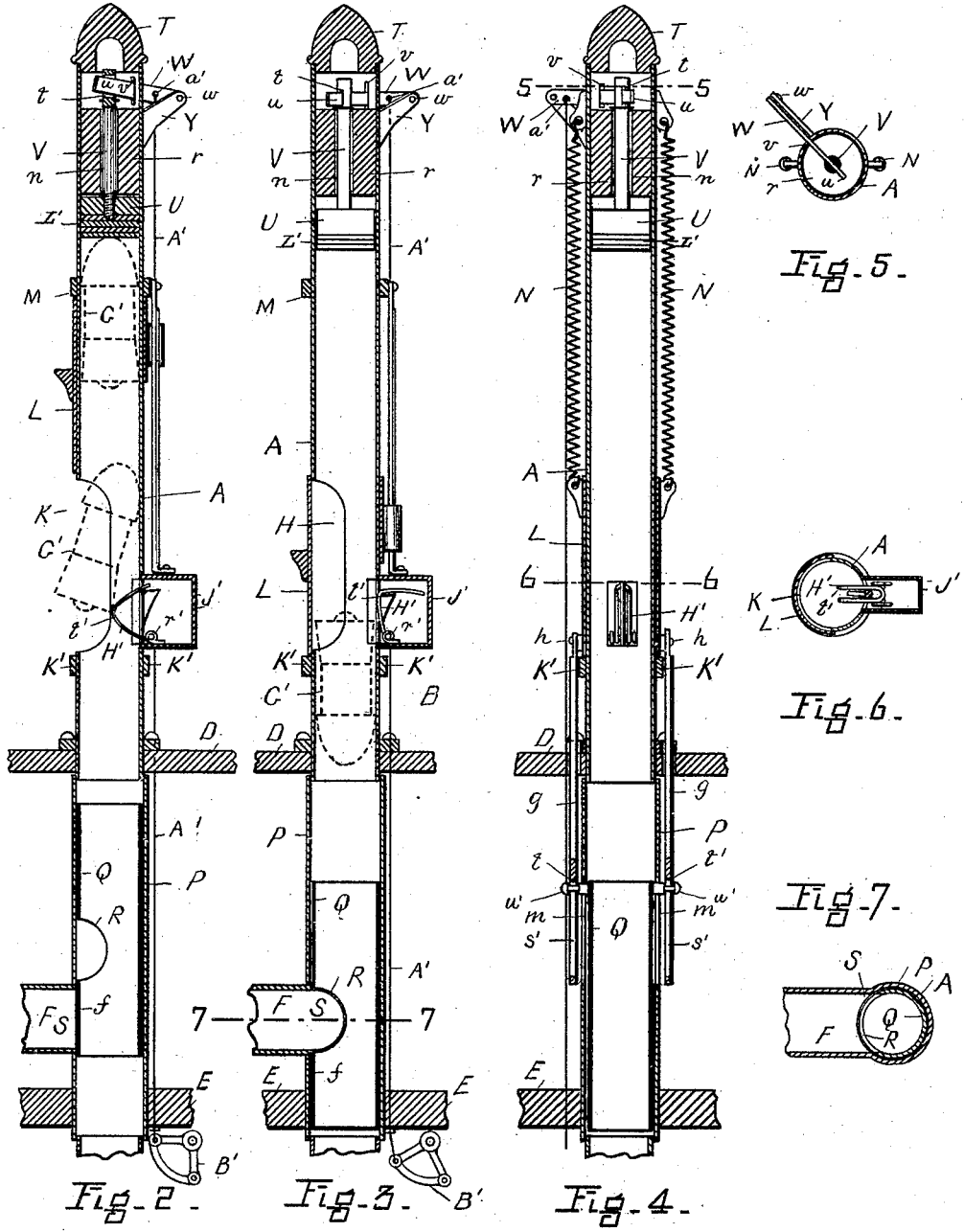

MARTIN BARRI, OF CAMBRIDGE, MASSACHUSETTS, ASSIGNOR, BY MESNE ASSIGNMENTS, TO THE METEOR DESPATCH COMPANY, OF PORTLAND, MAINE.

PNEUMATIC CASH-CARRIER APPARATUS.

SPECIFICATION forming part of Letters Patent No. 395,204, dated December 25, 1888.

Application filed October 15, 1887. Serial No. 252,482. (No model.)

*To all whom it may concern:*

Be it known that I, MARTIN BARRI, of Cambridge, in the county of Middlesex and State of Massachusetts, have invented certain new and useful Improvements in Pneumatic Cash-Carrier Apparatus, of which the following is a full, clear, and exact description.

This invention consists in the combination, with a pneumatic tube for the transmission of a carrier or other article therethrough, of means for indicating or signaling at the end of the pneumatic tube from which the carrier or other article is transmitted, operated by the carrier or other article when it arrives at some particular or designated point at or near the delivery end of the pneumatic tube or is delivered at said end of the tube, all substantially as hereinafter fully described, reference being had to the accompanying sheets of drawings, in which—

Figure 1 represents in front view a pneumatic tube arranged for the transmission of a carrier or other article through the tube from either end and having the present improvements applied thereto. Figs. 2 and 3 represent in vertical central section one end of the tube with some of the parts constituting the present invention applied thereto, the parts in Fig. 3 in different positions from those shown in Fig. 2; Fig. 4, a vertical central section similar to Fig. 3, but at right angles thereto. Fig. 5 is a cross-section on line 5 5, Fig. 4; Fig. 6, a cross-section on line 6 6, Fig. 4; and Fig. 7 a cross-section on line 7 7, Fig. 3.

In the drawings, A represents a pneumatic tube for the transmission therethrough of a carrier or other article from one end or station, B, to the other end or station, C, or vice versa, the tube being properly secured to the table or stand D at each station and extending from one end to the other below the tables D and through the flooring E, as shown more particularly in Fig. 1.

F is a pipe or tube communicating with the pneumatic tube A at $a$ at the end B and extending down through the floor along to and suitably arranged to have communication with any suitable air-motor. (Not shown.)

At the end C a pipe, G, communicates with the pneumatic tube at $b$, which joins and has communication with the pipe F at $d$. By the pipe F and its branch G air from the air-motor can communicate with the pneumatic tube A at either end for proper operation thereof, and as usual.

H is an opening in the tube A at the end B, where the carrier, &c., is inserted into or delivered from the pneumatic tube at such end, and K is another and similar opening in the tube A at the end C for similar purposes. These openings in the tube A are made by cutting out a portion of the front side of the tube, as shown, sufficiently large to admit and deliver the carrier or other article to be transmitted through the tube, and at the opening H is a cover or door, L, made of a short piece of tubing closely encircling but free enough to move up and down over the tube A, and when down to close and when up to open the opening H, it being limited in each movement by abutments or shoulders K′ M, respectively, on the tube A. On each side of this door or cover L is a spiral spring, N, secured to it and to the sides of the tube A, as shown, which by their tension act to hold the cover or door L up in the position shown in Figs. 1 and 2, and when the cover is moved down over and to close its opening H in the tube A, as shown in Figs. 3 and 4, it is against its springs N, which, when the cover or door is free, return it to its position to leave its opening free and clear.

At the opening K at the station end C is a door, L, having springs N and abutments K′ M, constructed and arranged for operation at such opening the same as at the opening H.

The tube A below the table at each end, as at P, is enlarged in order to allow for a short piece of tubing, Q, to closely fit within the tube A and yet be free to move up and down therein within certain limits, and this tube or pipe Q has an opening, R, in one side, which when the tube is down in the position shown in Fig. 3 comes opposite to and is coincident with the opening S to pipe F and pipe G, respectively.

Each tube Q at each end of the pneumatic tube serves as a valve or gate at its respective opening S, and when moved up its part $f$ is opposite to and over the opening, as shown in Fig. 2, closing the same to its respective pipe F G. It is also of the same internal diameter as the internal diameter of the main part of the pneumatic tube, so that the carrier or other article can pass through it freely.

Each tube or valve Q is connected by pitman-rods $g\ g$ to the cover or door L on the outside of the pneumatic tube A by pins or screws $h\ h$ and $u'\ u'$, the ones $u'\ u'$ to the valve Q passing through vertical slots $m$ in the tube A.

When a cover, L, is moved down to close the opening H or K, it carries with it the valve or gate Q, moving it into position for its opening R to be opposite to the opening S, leading to the pipe F or G, as shown in Figs. 3 and 7. Thus, when a carrier is to be transmitted through the tube A, it is put in the tube at one of the openings, H or K, when it will drop down below the opening S. The cover L is then moved down over its opening, which correspondingly moves down with it the gate or valve Q connected to it for the opening R to be coincident with the opening S, leading to the air-motor pipe F, when if air is forced through the pipe F it will pass to the tube A through the openings S R, forcing the carrier along the tube A to the other end, where it will be delivered, when, the cover at the end from which the carrier has been transmitted being allowed to rise to open its opening, its valve will correspondingly close the opening to the pipe F and shut the air off from the pneumatic tube.

The pneumatic tube at each end extends up a short distance above the opening and cover, as shown, being closed by any suitable cap or head, T, and it has in its upper end a piston-head, U, arranged to slide up and down freely therein.

A central stem, V, extends from the piston-head U, and projects up through a vertical central opening, $n$, in a block, $r$, secured within the tube, and by a vertical longitudinal slot, $t$, engages with one end, $u$, of a lever, W, passing through a slot, $v$, in the tube and pivoted at its other end at $w$ to an arm, Y, secured to the outside of the tube A. Connected to this lever W at $a'$ is a wire, A', which runs down side of the tube A and through the floor E and connects to one arm of a bell-crank, B', pivoted to the under side of the floor, the other arm of which bell-crank connects by a wire, C', to an arm of another bell-crank, D', pivoted to the under side of the floor at the end of the tube at C, which bell-crank D' by its other arm connects by a wire, E', to one end of a lever, $b'$, pivoted at $c'$ to a support below the table, the other end of which lever $b'$ engages with an arm, $d'$, of a lever, $f'$, pivoted at $g'$ to the support, its other arm, $h'$, being in position to strike against a bell, F', secured to the support, when properly moved to sound the same. The lever $b'$ has a spiral spring, $m'$, secured to one of its arms; and arranged to bear against the arm $d'$ of lever $f'$ is a flat spring, $n'$, secured to the support by which the several parts of the bell apparatus are returned to their normal positions after the bell has been sounded.

With the apparatus in its position, as shown in Fig. 1, and also in Figs. 2 and 3, which is in condition for the transmission through the pneumatic tube from either end of a carrier, &c., and the bellows or other air-motor in operation, the carrier G', &c., is inserted in the opening at the station B—for instance, with its forward end down the tube, as shown in Fig. 3 in dotted lines—and then the door or cover L is moved down by hand into the position shown in said figure, which carries down with it the gate or valve Q and brings its opening R in line with the opening S to the pipe F, leading to the air-motor, the air from which then passes through the pipe F into the pneumatic tube A and forces the carrier down through the same along and through the tube and delivers it at the station C. When the carrier arrives at the station C, its momentum carries it by the opening K, up to and strikes it against the piston-head U at such end and forces and raises the piston up with its stem V, carrying with it the end $u$ of lever W, as shown in Fig. 2, which in rising pulls upon the wire A', and through the bell-cranks B' D', wire E', and lever $b'$ the bell will be sounded at the station at B, which will indicate at such station that the carrier, &c., has arrived and been delivered at the station at C. The operator at the station B then releases the cover or door L, which, with the gate or valve Q, is raised by its springs N, opening its opening H in the tube ready for the reception or delivery thereat of a carrier, and closing the opening S to the air-motor pipe F, shutting off the air from the air-motor. After the carrier strikes the piston-head U, it falls therefrom and out at the opening K at such end of the tube, as shown in dotted lines in Fig. 2, and is delivered onto the table. Back of each opening is a wire spring, H', secured at $r'$ within a casing, J', at the side of the tube, and projecting, by its central bulging portion, $t'$, into the pneumatic tube, as shown in Figs. 2 and 6, in the line of travel of the carrier through the tube, and its purpose is, as the carrier falls back from the piston-head U, to force the carrier by its tension out at the opening, the spring insuring its being discharged at such opening and not falling back down in the tube A below it. The spring, however, is arranged to act lightly, so as to have practically no effect on the carrier when it passes by it in coming from the transmitting end of the tube, the momentum of the carrier at such time being sufficient to insure that it will pass to and strike the piston-head to give the signal at the end from which the carrier was transmitted; but as the momentum of the carrier when it falls from the piston-head is quite light the spring will be of sufficient power to act upon the carrier to then throw or force it out at the opening, where it will fall upon the table lightly. Thus, when a carrier or other article transmitted through the pneumatic tube arrives at the delivery end of said tube, the operator at the transmitting end of the tube, who has sent the carrier, is notified by the sounding of the bell of the arrival of the carrier at the delivery end. He can then open the door or cover L, which will close communication between the pneumatic tube and the air-motor, or if operating the air-motor himself can cease such operation and attend to other duties.

The piston-head U is covered on its under side with felt or india-rubber, L', or any suitable soft and yielding material, to prevent noise and injury to the carrier, &c. The back part of the cover at its lower end is cut away, as at v', as shown in Fig. 1 more particularly, so that it can slide down over the casing J'.

As shown in the drawings, the pneumatic tube is adapted to be operated from each end to send a carrier or other article back and forth through one tube, the arrangement for giving the signal, as described, being duplicated for operating at each end of the tube, and, as shown in Fig. 1, the view at the end B looks at the side of the opening H, and at the end C at the front or directly into the opening K of such end.

In lieu of using bell-cranks for changing the direction of the pull of the connecting-wires, one wire can be used and arranged to run over pulleys, and in such arrangement chains can be substituted for the wire where it runs over the pulleys.

Any suitable sounding device can be used in lieu of a bell, as shown, and the special means for sounding the same changed as desired and arranged to suit.

The valve Q is connected to the door at its end of the tube in such manner that it will not be moved to open until the door is nearly closed to prevent as much as possible air passing out at the opening H or K when shutting the door after placing a carrier therein, and this is accomplished by having a longitudinal slot, s', in each pitman-rod g, as shown in Fig. 4 more particularly, by which when the door is nearly closed the upper end, t', of the slots s' will abut against the pins u' of the valve, and then, in the continued downward movement of the door, will move the valve down and uncover the opening S of the pipe F, leading to the air-motor, for the air to pass therefrom to the pneumatic tube, the movement of the door being so much in excess of the required movement of the valve that it enables the closing of the valve to be done as described.

I do not in this application claim the sliding door and valve connected thereto, as such is claimed in an application of mine, Serial No. 252,481, nor the opening in the side of the tube and the spring opposite thereto with the cushion for the carrier to strike against, as such is in another application of mine, Serial No. 252,631.

A shoulder, K', on the tube A serves as a stop or rest for the door L to limit its downward movement when closed.

Having thus described my invention, what I claim is—

1. The combination, with a pneumatic tube for transmission therethrough of a carrier or other article, of a signaling or sounding device mechanically connected to mechanism extending into the pneumatic tube and operated by the carrier or other article as it comes to or passes by the same in its transmission through the tube.

2. The combination, with a pneumatic tube for transmission therethrough of a carrier or other article, of a signaling or sounding device connected to a piston-head, arranged to move back and forth in said tube for operation thereof by the carrier or other article as it is transmitted through the tube.

3. The combination, with a pneumatic tube for transmission therethrough of a carrier or other article, of a signaling or sounding device connected by wires and suitable bell-cranks to a lever, W, connected to a piston-head, U, arranged to move back and forth in said tube for operation thereof by the carrier or other article as it is transmitted through the tube.

In testimony whereof I have hereunto set my hand in the presence of two subscribing witnesses.

MARTIN BARRI.

Witnesses:
 EDWIN W. BROWN,
 PERCY BRYANT.